July 28, 1931.  R. D. BURFORD  1,816,358
SPRING DEVICE
Filed Feb. 5, 1929   2 Sheets-Sheet 1
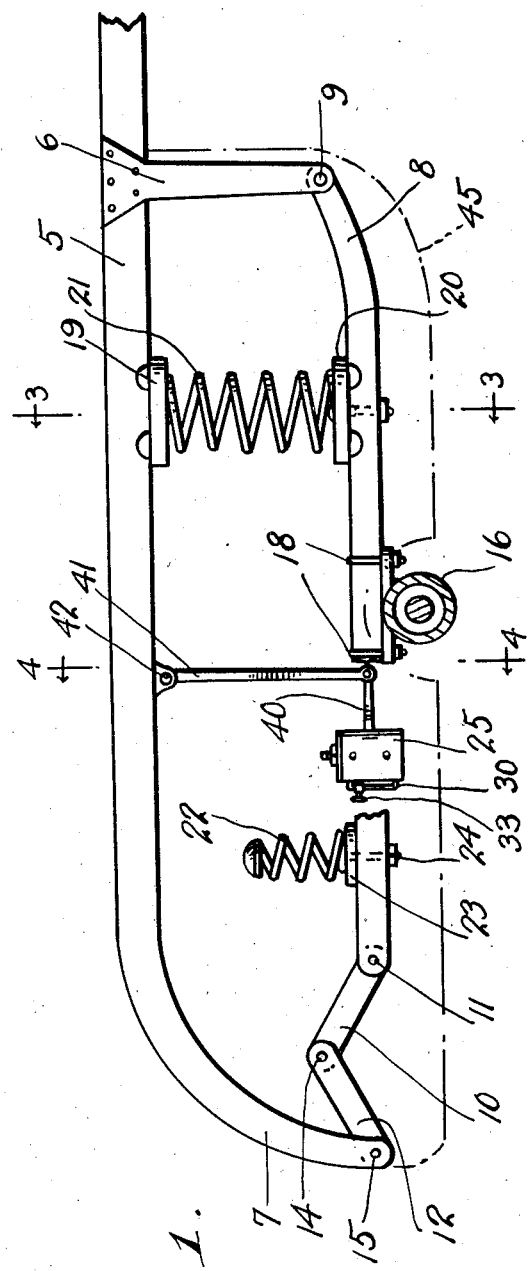
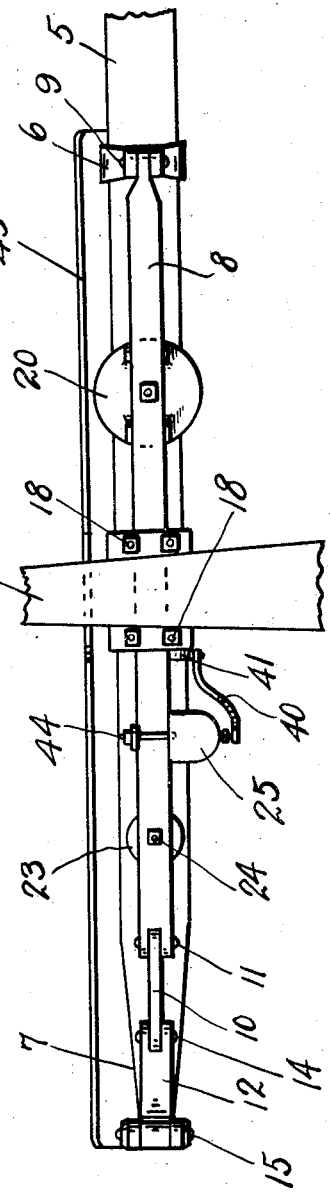
Inventor
R. D. Burford
By Clarence A. O'Brien
Attorney

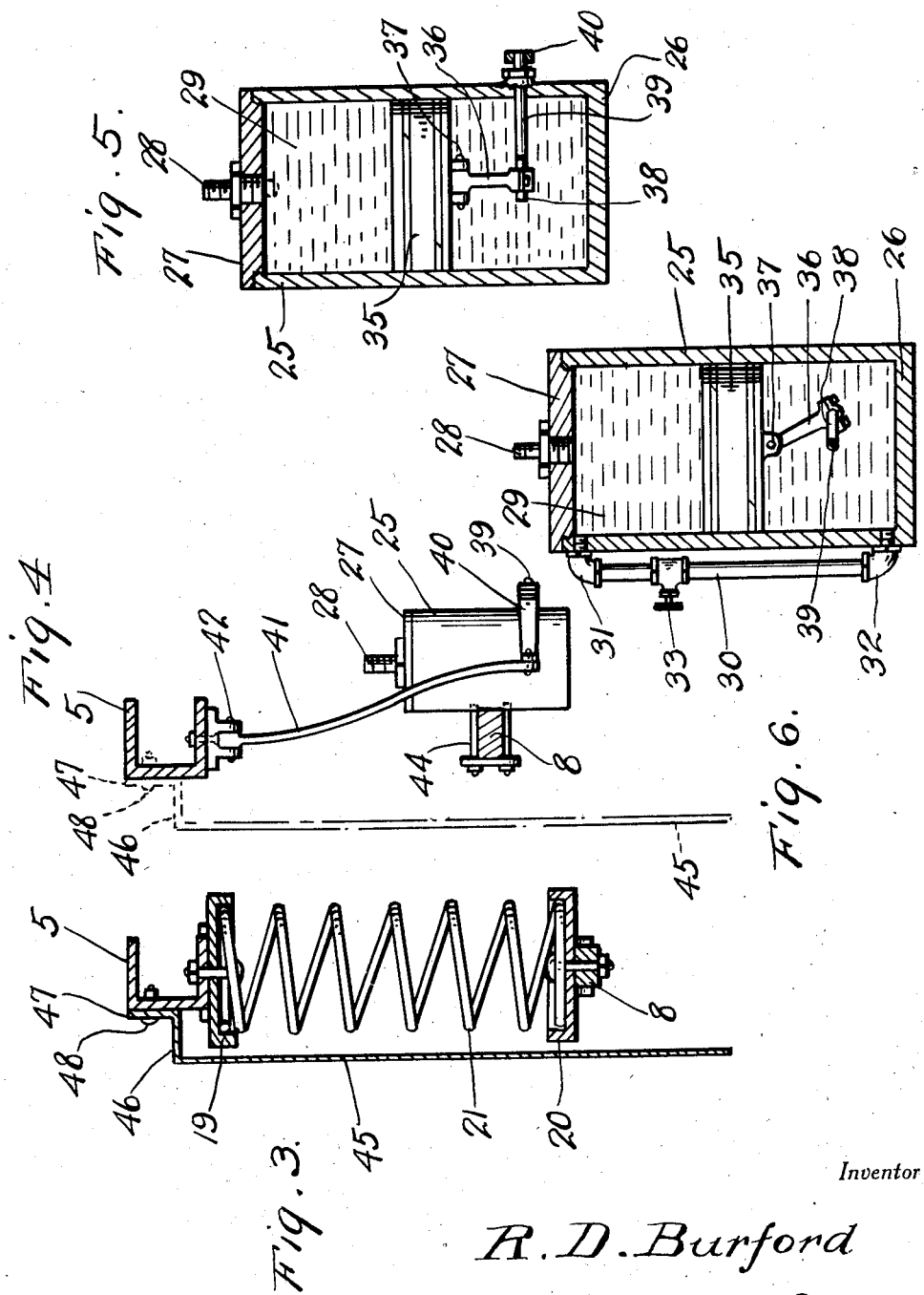

Patented July 28, 1931

1,816,358

UNITED STATES PATENT OFFIC

RUSSELL D. BURFORD, OF CHICAGO, ILLINOIS

SPRING DEVICE

Application filed February 5, 1929. Serial No. 337,619.

This invention relates to spring devices, and more particularly to spring devices especially designed for use in connection with motor vehicles or the like.

The primary object of the invention is to provide novel means disposed between supporting axles and chassis of a motor vehicle, for absorbing shock usually directed to the axles and distributing the same throughout the entire chassis, to enhance the riding qualities of the vehicle to which the spring devices are applied.

Another object of the invention is to provide a device of this character which will compensate for movement of the axle longitudinally of the chassis of the vehicle.

A still further very important object of the invention resides in the provision of a spring device of this nature which is simple in construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the device embodying the features of my invention showing one end of a side chassis bar and the axle in section, Figure 2 is a bottom plan view thereof, Figure 3 is a sectional view taken substantially on the line 3—3 of Figure 1, Figure 4 is a sectional view taken substantially on the line 4—4 of Figure 1, Figure 5 is a sectional view through the shock absorber, and Figure 6 is a similar view taken at right angles to that shown in Figure 5.

Referring to the drawing in detail, it will be seen that the numeral 5 denotes a side chassis bar from which depends a bracket arm 6 located a distance from the curved end 7 of the bar 5. An elongated lever bar 8 is pivoted at one end as at 9 to the lower extremity of the bracket bar 6.

A link 10 is pivotally connected as at 11 to the forward end of the lever bar 8. A link 12 is pivoted as at 14 to the link 10 and as at 15 to the extremity of the downwardly curved end 7 of the bar 5 and the pivot 14 is located above pivots 11 and 15.

Axle 16 is clamped by suitable means 18 to an intermediate portion of the lever bar 8. A disk 19 is fixed to the bar 5 and a similar disk 20 is fixed to the lever 8 and spring 21 is disposed between these disks and fastened thereto so that any swinging movement of the lever must compress or expand the spring 21.

A buffer spring 22 is fixed on a disk 23 to rise therefrom and this disk 23 is fixed as at 24 to the lever bar 8 adjacent the end to which the link 10 is pivoted.

This buffer spring will engage the bar 5 should the spring 21 be excessively compressed. A shock absorber comprises a cylinder 25 with a closed bottom 26 and a removable top 27 which has a plug 28 therein so that the cylinder may be filled with oil or other fluid indicated by numeral 29.

A pipe 30 is connected by elbow 31 with the top of the cylinder and by elbow 32 with the bottom of the cylinder. A valve 33 is mounted in the pipe 30 to control the flow of fluid therethrough. A piston 35 is mounted in the cylinder and a connecting rod 36 is engaged therewith by a wrist pin 37 and is engaged also with crank 38 of a shaft 39 journaled through one side of the cylinder and on its outer end having a crank 40 with which a link 41 is pivotally mounted.

This link 41 rises and is pivotally mounted as at 42 with the bar 5. The cylinder is mounted on the lever bar 8 by suitable means 43. A shield plate 45 has an offset upper end 46 with a rising flange 47 secured as at 48 to the bar 5 so that the spring device may not be seen from the side of the vehicle.

From the above detailed description it will be seen that movement between the axle and the side bar or rail of the chassis is compensated for by the spring 21 and also by the movement of the fluid in the cylinder 24 and through the pipe 30, the movement of this fluid being controllable by the valve 33.

It is believed that in view of the foregoing description, a further detail description of the operation of the device is unnecessary. The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination with a vehicle chassis side rail having a downturned end portion, a bracket fixed to the side rail and depending from said side rail in spaced relation to the down turned end portion, a lever bar pivotally connected, at one end, to the free end of the bracket and extending therefrom toward the down turned end portion and terminating in spaced relation to said down turned end portion, the lever bar normally disposed substantially parallel with the side rail and substantially in the horizontal plane of the down turned end of the side rail, a coiled spring mounted between the side rail and the lever bar for yieldingly maintaining said lever bar substantially parallel to the side rail, and a pair of pivotally connected links, one of the links having one end pivotally connected to the free end of the lever bar, the other of the links having one end pivotally connected to the down turned end of the side rail, the pivotal connection of the links being normally above the horizontal planes of the pivotal connections of the links to the lever bar and the side rail.

In testimony whereof I affix my signature.

RUSSELL D. BURFORD.